(12) United States Patent
Wagenaar

(10) Patent No.: US 8,937,516 B2
(45) Date of Patent: Jan. 20, 2015

(54) DEVICE AND METHOD FOR REDUCING HARMFUL EFFECTS OF ELECTROMAGNETIC RADIATION

(75) Inventor: Wilhelmus Adrianus Johannes Maris Wagenaar, Hertogenbosch (NL)

(73) Assignee: W.W.I.M. Ltd., Limassol (CY)

( * ) Notice: Subject to any disclaimer, the term of this patent is extended or adjusted under 35 U.S.C. 154(b) by 939 days.

(21) Appl. No.: 13/054,116

(22) PCT Filed: Jul. 14, 2009

(86) PCT No.: PCT/NL2009/050434
§ 371 (c)(1),
(2), (4) Date: Feb. 10, 2011

(87) PCT Pub. No.: WO2010/008284
PCT Pub. Date: Jan. 21, 2010

(65) Prior Publication Data
US 2011/0128050 A1 Jun. 2, 2011

(30) Foreign Application Priority Data
Jul. 14, 2008 (NL) .................................. 2001801

(51) Int. Cl.
| | | |
|---|---|---|
| H04B 5/00 | (2006.01) | |
| H02J 17/00 | (2006.01) | |
| H04B 1/38 | (2006.01) | |
| H01Q 1/24 | (2006.01) | |
| H01Q 5/00 | (2006.01) | |
| H01Q 17/00 | (2006.01) | |
| H01Q 21/30 | (2006.01) | |
| H01Q 1/22 | (2006.01) | |

(52) U.S. Cl.
CPC .............. *H04B 1/3838* (2013.01); *H01Q 1/245* (2013.01); *H01Q 5/00* (2013.01); *H01Q 17/00* (2013.01); *H01Q 21/30* (2013.01)
USPC ........................................... 333/12; 343/749

(58) Field of Classification Search
CPC .......... G06K 7/0008; H01Q 1/22; H02J 17/00
USPC ................................. 333/12; 343/700 R, 749
See application file for complete search history.

(56) References Cited

U.S. PATENT DOCUMENTS

| | | | |
|---|---|---|---|
| 4,068,232 A | | 1/1978 | Meyers et al. |
| 6,314,277 B1* | | 11/2001 | Hsu et al. ...................... 455/117 |
| 7,180,421 B2* | | 2/2007 | Pahlaven et al. ........... 340/572.1 |
| 7,206,380 B2* | | 4/2007 | Anno et al. .................... 378/130 |
| 8,130,159 B2* | | 3/2012 | Wuidart et al. ............... 343/749 |
| 2003/0169169 A1* | | 9/2003 | Wuidart et al. ............ 340/572.7 |

FOREIGN PATENT DOCUMENTS

GB           2430107 A       3/2007

* cited by examiner

*Primary Examiner* — Dean O Takaoka
*Assistant Examiner* — Alan Wong
(74) *Attorney, Agent, or Firm* — Endurance Law Group, PLC

(57) ABSTRACT

The present invention relates to a device and a method for reducing harmful effects to people of a first alternating electromagnetic field that is characterized by a first frequency. According to the invention, the device comprises extraction means for extracting electric power from the first alternating electromagnetic field and transmission means for transmitting a second alternating electromagnetic field that is characterized by a second frequency. During operation, the transmission means are supplied with the electric power extracted by the extraction means, and the first and the second frequency are different.

14 Claims, 6 Drawing Sheets

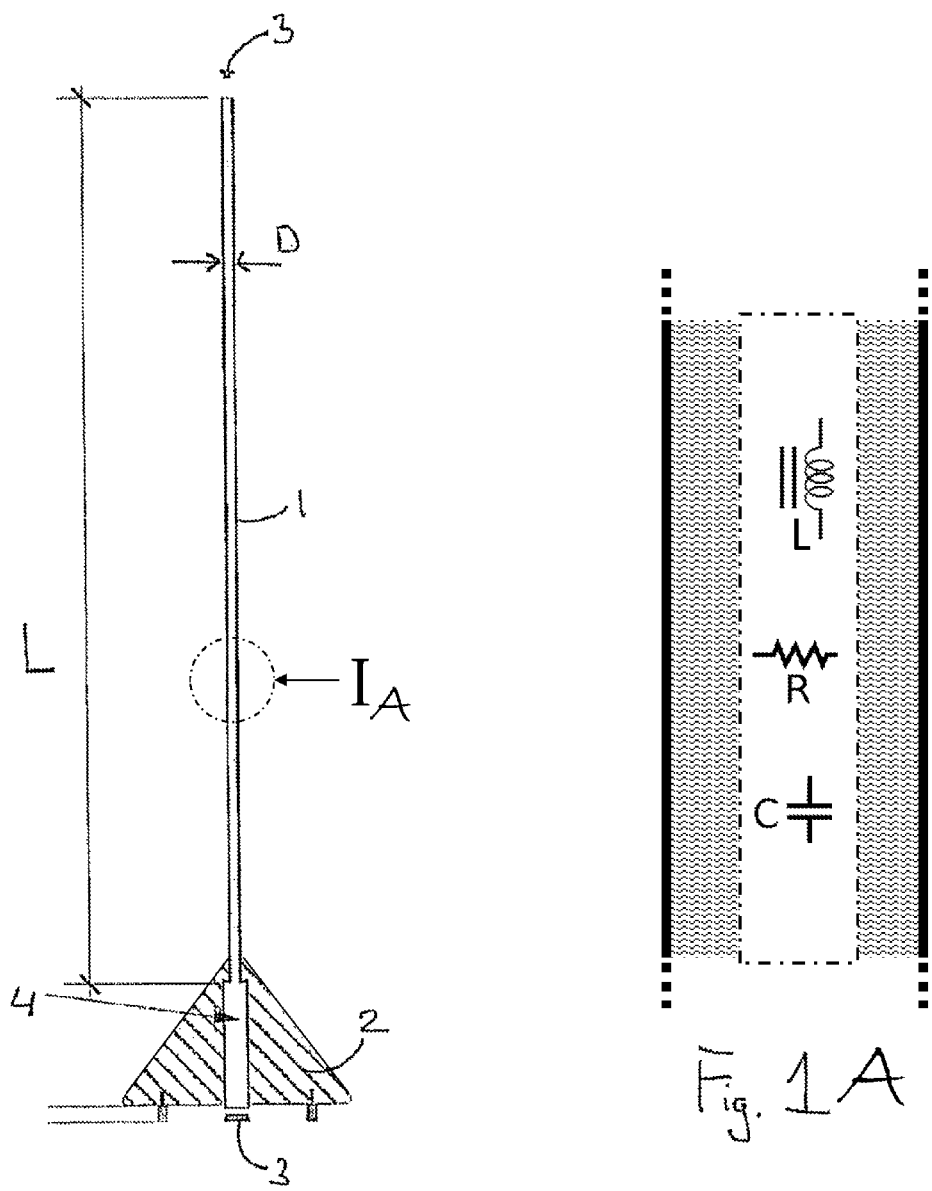

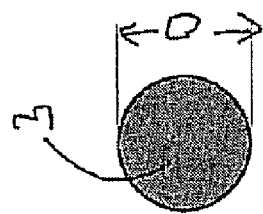
FIG. 2B
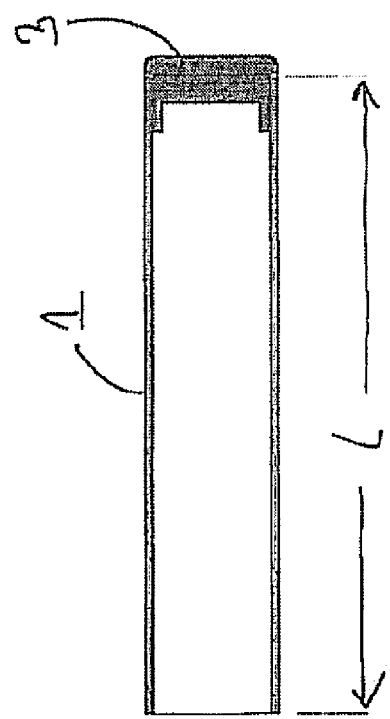
FIG. 2A
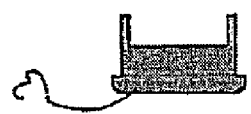
FIG. IIb

DEVICE AND METHOD FOR REDUCING HARMFUL EFFECTS OF ELECTROMAGNETIC RADIATION

BACKGROUND OF THE INVENTION

1. Field of the Invention

The present invention relates to a device and a method for reducing harmful effects of electromagnetic radiation.

2. Related Art

The harmful effects on people's health of radiation, in particular electromagnetic radiation, also called electro smog, for example from a mobile telephone, a radio/TV mast or a television set are increasingly recognised as a health hazard to people. According to various studies, there is a significant increase of the following symptoms among people who live in particular quite close to a radio/TV mast: headaches, migraine, sleep disorders, irritability, depression disorders, fatigue, concentration problems, malaise and memory defects. In the case of electromagnetic waves having a radiant intensity of 10-100 $\mu W/m^2$, there is an increased risk of such symptoms, whilst in daily practice people are exposed to much higher radiant intensities, for example a few thousand $\mu W/m^2$. Other studies even indicate that exposure to high radiant intensities may result in an increased risk of cancer and miscarriages.

SUMMARY OF THE INVENTION

It is an object of the invention to reduce the harmful effects on people's health of radiation from an electromagnetic device in general, but in particular from a mobile telephone, a radio/TV mast, a television set or the like.

In order to accomplish that object, the invention provides a device as defined in claim 1. The device according to the invention comprises extraction means for extracting electric power from a first alternating electromagnetic field that is characterised by a first frequency. The device further comprises transmission means for transmitting a second alternating electromagnetic field that is characterised by a second frequency. During operation, the transmission means are supplied with the electric power extracted by the extraction means. An important aspect is the fact that the first and the second frequency are different.

The intended result is obtained by extracting power from the electromagnetic field in a spectral range which is harmful to people and transmitting a second electromagnetic field which is at least not harmful to people, and possibly even beneficial.

A special form of an alternating electromagnetic field is electromagnetic radiation. However, the invention relates to alternating magnetic or electric fields. Important is that the fields are such that electric power can be extracted therefrom.

It has been found that very favourable results can be obtained if the second frequency f2 corresponds substantially to a value given by the equation:

$$f2 = n1 \times fn \times 10^{n2};$$

where n1 and n2 are integers and fn is a value selected from the group consisting of {22.5 40.0 77.5 78.5 89.5 99.5}. Preferably, n1 has a value of 10,000 Hz. It will be understood that minor deviations, such as +/−10%, from theses values can also lead to positive effects.

It has been found to be advantageous if the transmission means are designed to transmit a third alternating electromagnetic field simultaneously with the second electromagnetic field, which third electromagnetic field is characterised by a third frequency that corresponds substantially to a frequency from the group of natural frequencies. It is preferable if said third frequency is different from the second frequency.

The device is preferably suitable for suppressing the harmful effects of electromagnetic radiation used in radio-frequency (RF) communication technology, such as mobile communication or wireless communication. Accordingly it is advantageous if the first frequency corresponds to a harmonic frequency belonging to a carrier frequency of such technology. Reference is made in this connection to the various frequency bands of mobile telephony, such as (E)GSM, DCS/PCS. The term "harmonic frequency" in this case also comprises the fundamental frequency.

In one embodiment, the extraction means and the transmission means comprise a first antenna and a second antenna, respectively, for receiving and transmitting the first and the second alternating electromagnetic field, respectively.

To achieve an efficient extraction of electric power, it is advantageous if the antenna forms part of a first tuned electrical circuit.

It is also advantageous if the second antenna forms part of a second tuned electrical circuit. The first and the second antenna may be composed at least in part of the same components, and in a very advantageous embodiment, use is made of one and the same antenna. Also as regards the tuned electrical circuit it is advantageous if the first and the second tuned circuit are composed at least in part of the same electrical components. An embodiment in which the various parts of the transmission means and the extraction means are combined provides a compact solution while using a minimum amount of parts.

Preferably, the length of the first and/or second antenna is related to the first frequency. More in particular, the length of the antenna is related to the wavelength corresponding to the first frequency, wherein the length of the antenna is preferably approximately ¼ of the wavelength.

The first and/or the second tuned circuit comprise(s) a discrete coil and resistor, said coil and/or resistor having a parasitic capacitance that forms part of the first tuned circuit.

The combination of resistor, capacitance and coil results in a known damped tuned electrical circuit. A discrete capacitor may be used instead of a parasitic capacitor. Furthermore, the resistor may be an integral part of another component, such as the coil, for example in the form of the resistance of the windings.

A discrete component such as a resistor, coil, or capacitor, should be interpreted as a component which can be placed as a whole, in contrary to distributed elements such as a microstrip. However, other forms of components are not excluded.

The device may comprise an at least partly closed metal housing, in which the transmission means and the extraction means are accommodated. Furthermore, the components that carry a current or voltage are provided with an electrically insulating material at an outer side. This makes it possible to accommodate a liquid, such as water and/or ethanol, in the housing. The possibility of accommodating the liquid without the insulation material is not excluded, however. Resonance frequencies may be added to the liquid.

It should be noted that the housing itself may form part of an antenna used for receiving and or transmitting electromagnetic energy.

It is advantageous if the first and/or the second tuned circuit comprises a dissipating element, such as a resistor. The resistor is capable of converting a part of the radiation that is harmful to people into heat by thermal dissipation.

The first and/or the second tuned electrical circuit may comprise a nonlinear element for frequency transformation of the electric signals. Such a nonlinear element may be formed by a discrete component having nonlinear properties or by a separate device which converts the frequency of the first electromagnetic field into the frequency or frequencies of the second electromagnetic field.

According to a preferred embodiment of the device according to the invention, the transmission means are designed to transmit the second alternating electromagnetic field characterized by a fourth frequency, wherein the fourth frequency comprises a frequency chosen from the medium wave frequency band, more in particular a frequency between 1 and 100 kHz. These frequencies are not as detrimental on human beings as the incident first alternating electromagnetic field of for instance a mobile phone.

Preferably, the transmission means are furthermore designed to add a further frequency to said second alternating electromagnetic field, wherein said further frequency comprises at least one of the aforementioned natural frequencies. Consequently, the second alternating electromagnetic field will be characterized by a natural frequency and the fourth frequency.

More preferably the device comprises an information carrier, wherein the information carrier comprises information regarding the second natural frequency f2. The transmission means and the information carrier are preferably arranged to couple said second natural frequency f2 to said fourth frequency for adding said second natural frequency to the fourth frequency. Preferably, the coupling comprises magnetic and/or capacitive coupling. The information carrier can be provided in the form of a chip, water and/or powder provided with information.

Even more preferably, the fourth frequency functions as a carrier wave for the second natural frequency, wherein adding the second natural frequency comprises modulating said second natural frequency by said fourth frequency. As such, two signals, one characterized by a frequency corresponding to the fourth frequency, and one characterized by a frequency corresponding to a natural frequency, are combined by modulation. The type of modulation is preferably of the amplitude modulation type although phase and or frequency modulation are expressly not excluded.

The invention also provides a method of reducing harmful effects to people of a first alternating electromagnetic field that is characterised by a first frequency. The method according to the invention comprises the steps of extracting electric power from the first alternating electromagnetic field and transmitting a second alternating electromagnetic field that is characterised by a second frequency. The transmission means are supplied with the extracted electric power.

It is advantageous if the second frequency f2 corresponds substantially to a value from the aforesaid group of natural frequencies.

It has furthermore been found to be advantageous if the method comprises the step of transmitting a third alternating electromagnetic field simultaneously with the transmission of a second alternating electromagnetic field, which third electromagnetic field is characterised by a third frequency that corresponds substantially to a frequency from the group of natural frequencies. It is preferable if the third frequency is different from the second frequency. The amplitude of this third field may be small.

BRIEF DESCRIPTION OF THE DRAWINGS

Embodiments of the invention will be described below with reference to the appended figures, in which:

FIG. 1 is a general view of an embodiment of the invention, in which the emission means and the extraction means are accommodated in a cylinder;

FIG. 1A is a detail view as taken generally from the region circumscribed at 1A in FIG. 1, in which the emission means and the extraction means are symbolically indicated within the cylinder housing;

FIG. 2A is a cross-sectional view of another embodiment of a device according to the invention;

FIG. 2B is a view according to arrow II in FIG. 2A;

DETAILED DESCRIPTION OF THE PREFERRED EMBODIMENT

Figure 3:
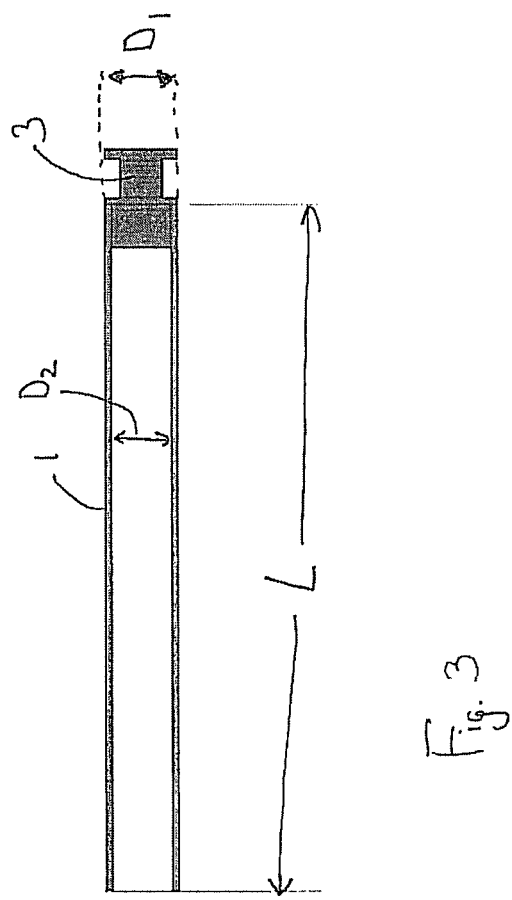
FIG. 3 is a cross-sectional view of another embodiment.

Hereinafter a description will be given of a number of embodiments of a tuned circuit that can be used as a first and/or a second tuned circuit.

Embodiment 1

Components

The coil consists of a copper wire wound around an iron core.
Number of windings=993.
The resistor is a carbon resistor.
Resistance value R=10 MΩ
Power P=0.4 W
Capacitor:
The capacitor is an electrolytic capacitor.
Capacitance C=2200 µF
Operating voltage V=25 V
Liquid
Physical and Mechanical Structure:
The components are placed in a stainless steel cylinder 1 having a length L of 500 mm and a diameter D of 8 mm, which cylinder is disposed in a wooden standard 2 in the shape of a pyramid, see FIG. 1. The cylinder 1 is sealed with silicone sealing plugs 3. Dimension iron coil core Ø 3 mm. Dimension copper coil wire Ø 0.5 mm. The resistor and the coil are directly soldered to the contacts of the capacitor. The liquid is present in a glass ampoule 4 and is connected to the RLC chain by means of a copper coil wire.
Instructions:
The first embodiment is placed at the lowest point in the house and thus has a cylindrical range in upward and downward direction.

Embodiment 2

Components

Coil:
The coil consists of a copper wire wound around an iron core.
Number of windings=822.
Resistor:
The resistor is a carbon resistor.

Resistance value R=10 MΩ
Power P=0.4 W
Capacitor:
The capacitor is an electrolytic capacitor.
Capacitance C=2200 μF
Operating voltage V=25 V
Liquid
Physical and Mechanical Structure:
The components are placed in a stainless steel cylinder 1, which is disposed in a wooden standard, see FIG. 1. The cylinder is sealed with silicone plugs 3. Dimension iron coil core Ø 3 mm. Dimension copper coil wire Ø 0.5 mm. The resistor and the coil are directly soldered to the contacts of the capacitor. The liquid is present in a glass ampoule 4 and is connected to the RLC chain by means of a copper coil wire.
Instructions:
The second embodiment is placed at the highest point in the house and thus has a cylindrical range in upward and downward direction.

Embodiment 3

Components

Coil:
The coil consists of 3 copper wires wound around an iron core. These 3 coils are connected in series and have coupled self-inductances.
Number of windings $L_1$=41
Number of windings $L_2$=44
Number of windings $L_3$=54
Resistor:
The resistor is a carbon resistor.
Resistance value R=10 MΩ
Power P=0.4 W
Capacitor:
The capacitor is an electrolytic capacitor.
Capacitance C=2200 μF
Operating voltage V=16 V
Liquid:
Physical and Mechanical Structure:
The components are placed in a stainless steel cylinder 1, which is disposed in a wooden standard, see FIG. 2A for a cross-sectional view and FIG. 2B for a view in direction IIb. The cylinder 1 has a length L of 65 mm and a diameter D of 14 mm. The cylinder is sealed with silicone plugs 3. Dimension iron coil core Ø 3 mm. Dimension copper coil wire Ø 0.4 mm. The resistor and the coil are directly soldered to the contacts of the capacitor.
Instructions:
The third embodiment is worn or placed beside the body and thus has a cylindrical range in upward and downward direction.

Embodiment 4

Components

Coil:
The coil consists of 3 copper wires wound around an iron core. These 3 coils are connected in series and have coupled self-inductances.
Number of windings $L_1$=41
Number of windings $L_2$=44
Number of windings $L_3$=54
Resistor:
The resistor is a carbon resistor.
Resistance value R=10 MΩ
Power P=0.4 W
Capacitor:
The capacitor is an electrolytic capacitor.
Capacitance C=2200 μF
Operating voltage V=25 V
Liquid
Physical and Mechanical Structure:
The components are placed in a stainless steel cylinder 1, see FIGS. 2A en 2B. The cylinder 1 has a length L of 65 mm and a diameter D of 22 mm. The cylinder is sealed with silicone plugs 3. Dimension iron coil core Ø 3 mm. Dimension copper coil wire Ø 0.4 mm. The resistor and the coil are directly soldered to the contacts of the capacitor.
Instructions:
The fourth embodiment is worn or placed beside the body and thus has a cylindrical range in upward and downward direction.

Embodiment 5

Components

Coil:
The coil consists of a copper wire wound around an iron core.
Number of windings=125.50.
Resistor:
The resistor is a carbon resistor.
Resistance value R=10 MΩ
Power P=0.4 W
Capacitor:
As a result of parasitic effects in the resistor and the coil, a capacitor is added to the circuit. Capacitance C=1 pF.
Physical and Mechanical Structure:
The components are placed in a stainless steel cylinder 1, which is sealed with stainless steel plugs 3, see FIG. 3. The cylinder 1 has a length L of 92 mm and an outside diameter $D_1$ of 10 mm and an inside diameter $D_2$ of 8 mm. The plugs 3 may also be configured as transparent silicone plugs. Dimension iron coil core Ø 3 mm. Dimension copper coil wire Ø 0.5 mm. The coil is directly soldered to the resistor contacts.
Instructions:
The fifth embodiment is attached to the heating network by means of stainless steel cable ties and thus has a range around the entire heating network.

Embodiment 6

Components

Coil:
The coil consists of a copper wire wound around an iron core.
Number of windings=233.50.
Resistor:
The resistor is a carbon resistor.
Resistance value R=10 MΩ
Power P=0.4 W
Capacitor:
As a result of parasitic effects in the resistor and the coil, a capacitor having a capacitance C of 1 pF is added to the circuit.

Physical and Mechanical Structure:

The components are placed in a stainless steel cylinder 1, which is sealed with stainless steel plugs 3, see FIG. 3. The cylinder 1 has a length L of 92 mm and an outside diameter $D_1$ of 10 mm and an inside diameter $D_2$ of 8 mm. The plugs 3 may also be configured as transparent silicone plugs. Dimension iron coil core Ø 3 mm.

Dimension copper coil wire Ø 0.5 mm.

The coil is directly soldered to the resistor contacts.

Instructions:

The sixth embodiment is attached to the electricity network before the meter cupboard by means of stainless steel cable ties and thus as a range around the entire electricity network.

Embodiment 7

Components

Coil:

The coil consists of a copper wire wound around an iron core.

Number of windings=344.50.

Resistor:

The resistor is a carbon resistor.

Resistance value R=10 MΩ

Power P=0.4 W

Capacitor:

As a result of parasitic effects in the resistor and the coil, a capacitor having a capacitance C of 1 pF is added to the circuit.

Physical and Mechanical Structure:

The components are placed in a stainless steel cylinder 1, which is sealed with stainless steel plugs 3, see FIG. 3. The cylinder 1 has a length L of 92 mm and an outside diameter $D_1$ of 10 mm and an inside diameter $D_2$ of 8 mm. The plugs 3 may also be configured as transparent silicone plugs. Dimension iron coil core Ø 3 mm.

Dimensions copper wire winding coil Ø 0.5 mm.

The coil is directly soldered to the resistor contacts.

Instructions:

The seventh embodiment is attached to the heating network by means of stainless steel cable ties and thus has a range around the entire network of water pipes.

Embodiment 8

Components

Coil:

The coil consists of a copper wire wound around an iron core.

Number of windings=111.50.

Resistor:

The resistor is a carbon resistor.

Resistance value R=10 MΩ

Power P=0.6 W

Capacitor:

As a result of parasitic effects in the resistor and the coil, a capacitor having a capacitance C of 1 pF is added to the circuit.

Figures 4A, 4B:
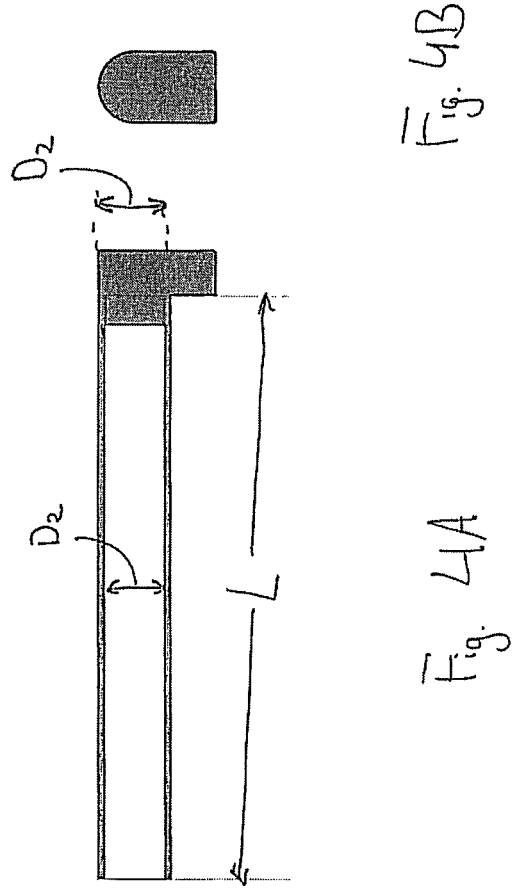
FIG. 4A is a cross-sectional view of yet another embodiment.
FIG. 4B is a view according to arrow IV in FIG. 4B.

Physical and Mechanical Structure:

The components are placed in a stainless steel cylinder 1, which is sealed with stainless steel plugs 3, see FIG. 4A and FIG. 4B, which is a view in direction IVb. The cylinder 1 has a length L of 78 mm and an outside diameter $D_1$ of 10 mm and an inside diameter $D_2$ of 8 mm. The plugs 3 may also be configured as transparent silicone plugs. Dimension iron coil core Ø 3 mm. Dimension copper coil wire Ø 0.5 mm. The coil is directly soldered to the resistor contacts.

Instructions:

The eighth embodiment is placed near the monitor or the television screen and thus has a cylindrical range around the eighth embodiment.

Embodiment 9

Components

Coil:

The coil consists of a copper wire wound around an iron core.

Number of windings=14.

Resistor:

The resistor is a carbon resistor.

Resistance value R=10 MΩ

Power P=0.6 W

Capacitor:

As a result of parasitic effects in the resistor and the coil, a capacitor having a capacitance C of 1 pF is added to the circuit.

Figure 5A:
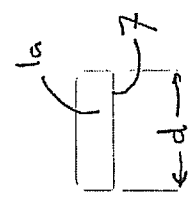
FIG. 5A is a cross-sectional view of yet another embodiment.
Figure 5B:
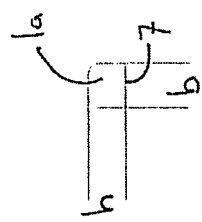
FIG. 5B shows the embodiment of FIG. 5A, seen in direction Vb.

Physical and Mechanical Structure:

The components are placed in a stainless steel housing 1a, see FIG. 5A and FIG. 5B, which is a view in direction Vb. The housing has a height h of 5 mm, a width b of 6 mm and a depth d of 16 mm. The housing has a flat side 7, which can be connected to a mobile Telephone. Dimension iron coil core Ø 0.85 mm. Dimension copper coil wire Ø 0.5 mm. The coil is directly soldered to the resistor contacts.

Instructions:

The ninth embodiment is attached to the mobile telephone and thus has a cylindrical range around the ninth embodiment during use of the telephone or during the WLAN function.

The different embodiments have working ranges which vary from approximately 0.5 meter to 20 meters. It should however be noted that the strength of the second field is dependent on the strength of the first field. In case an embodiment is placed in a strong first field, the range and the strength of the second field may increase proportionally and vice versa.

Table 1 shows the preferred frequencies of the various embodiments of the invention. Thus, the first embodiment is for example designed to extract energy from a field that is characterised by a frequency of 3960 Hz. Transmission takes place at a frequency characterized by fn=22.50.

TABLE 1

| # | Frequency first field f1 | Frequency(ies) generated fields fn |
|---|---|---|
| 1 | 3960 Hz | 22.50 |
| 2 | 8658 Hz | 99.50 |
| 3 | 0.6678 GHz | 89.50 |
| 4 | 0.4768 GHz | 22.50/77.50 |
| 5 | 0.2759 GHz | 22.50/40.00/78.50 |
| 6 | 6957 Hz | 77.50/78.50/89.50 |
| 7 | 6957 Hz | 77.50/78.50/89.50 |
| 8 | 0.4869 GHz | 99.50 |
| 9 | 3.768 GHz | 22.50/99.50 |

Table 2 shows further specifications of the embodiments, wherein the column labelled circuit specifies the components of the circuit, the column labelled L specifies the inductance at 10 KHz, R specifies the resistance, C the capacity, L1 the length of the coil, L2 the length of the circuit, L3 the length of the housing and the column coupling specifies the method used for coupling the second frequency to the fourth frequency in the second field.

test, indicating that the influence of the electromagnetic field on the test persons was decreased due to the device according to the invention.

TABLE 2

| # | Circuit | L at 10 KHz | R | C | L1 (mm) | L2 (mm) | L3 (mm) | Coupling |
|---|---------|-------------|---|---|---------|---------|---------|----------|
| 1 | L/C | 229.8 µH/13.9 Ohm | | 2200 µF/25 V | 550 | 555 | 580 | capacitive |
| 2 | L/C | 187.3 µH/11.1 Ohm | | 2200 µF/25 V | 465 | 470 | 495 | capacitive |
| 3 | L/L/L/R/C | 1.71 µH/615 mOhm | 10M Ohm | 2200 µF/16 V | 22/25/30 | 52 | 70 | capacitive |
| 4 | L/L/L/R/C | 1.71 µH/615 mOhm | 10M Ohm | 2200 µF/25 V | 22/25/30 | 52 | 70 | capacitive |
| 5 | L/R | 26.0 µH/807 Ohm | 10M Ohm | | 75 | | 108 | magnetic |
| 6 | L/R | 50.2 µH/2.33 Ohm | 10M Ohm | | 132 | | 165 | magnetic |
| 7 | L/R | 76.0 µH/3.9 Ohm | 10M Ohm | | 192 | | 225 | magnetic |
| 8 | L/R | 121 µh/619 mOhm | 10M Ohm | | 65 | | 110 | magnetic |
| 9 | L/R | 1 µH/475 mOhm | 10M Ohm | | 9 | | 10 | magnetic |

Example 1

In order to demonstrate the ability of the device according to the invention to use a first field for transmitting a second electrical magnetic field, a test was conducted.

For each of the different embodiments of the device according to the invention, an electromagnetic field with a frequency f1 as listed in table 3 was created and the different embodiments were exposed to said electromagnetic field.

Next, the second electromagnetic field transmitted by the device was measured. More in particular, the fourth frequency of said field was measured and the results are listed in table 3. All frequencies measured from the different embodiments were in the middle frequency band.

TABLE 3

| Emb # | Frequency first field f1 | Frequency second field f4 |
|-------|--------------------------|---------------------------|
| 1 | 144193 Hz | 1401 Hz |
| 2 | 2460 MHz | 4930 Hz |
| 3 | 1890 MHz | 16351 Hz |
| 4 | 1890 MHz | 16351 Hz |
| 5 | 75.00 KHz | 13222 Hz |
| 6 | 32.00 KHz | 9515 Hz |
| 7 | 75.00 KHz | 4891 Hz |
| 8 | 176 KHz | 6134 Hz |
| 9 | 1852 MHz | 21321 Hz |

Example 2

To determine the influence of the device according to the invention on human beings, a test was conducted. Seven persons, of varying age and gender, where first exposed to an environment with a DECT/WLAN field for 30 minutes. During this exposure, the conductivity of the skin was measured at intervals of 3 to 30 seconds.

The conductivity of the skin is a measure of the amount of stimuli a person experiences and the influence of said stimuli. Such a measurement is also known as a georythmogram.

Figure 6A:
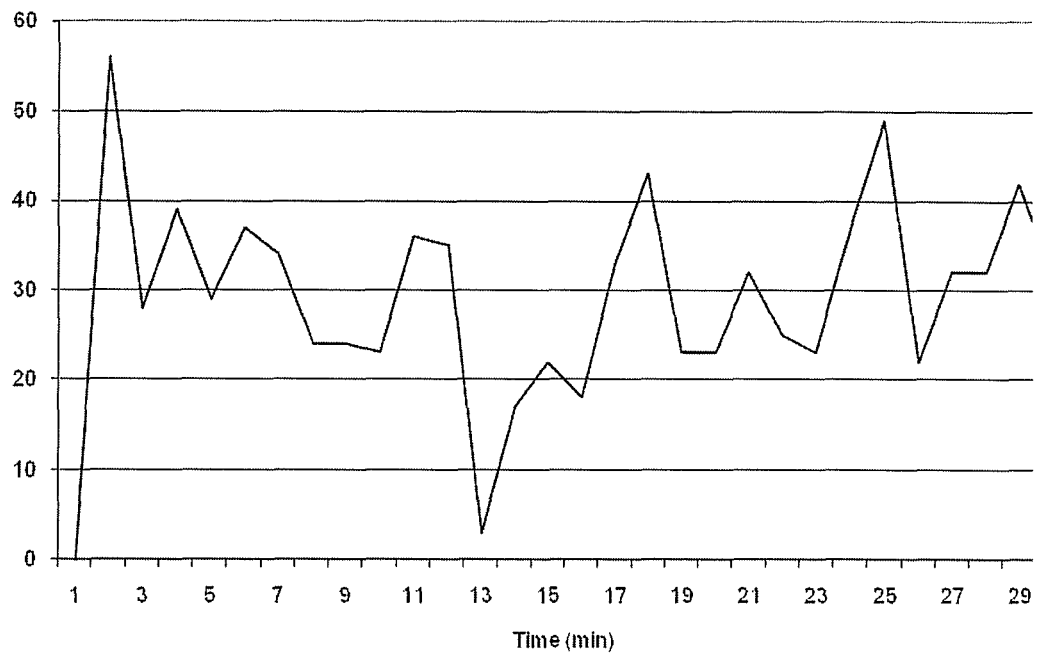
FIGS. 6a and 6b show results from a test.

The averaged measurements for the seven persons are plotted in FIG. 6a. A fluctuating conductivity can be seen in FIG. 6a, indicating a restless state of the test persons.

Next, the same measurements were taken in the same environment whereby a device according to embodiments 3 or 4 was placed in close proximity of the test person.

Figure 6B:
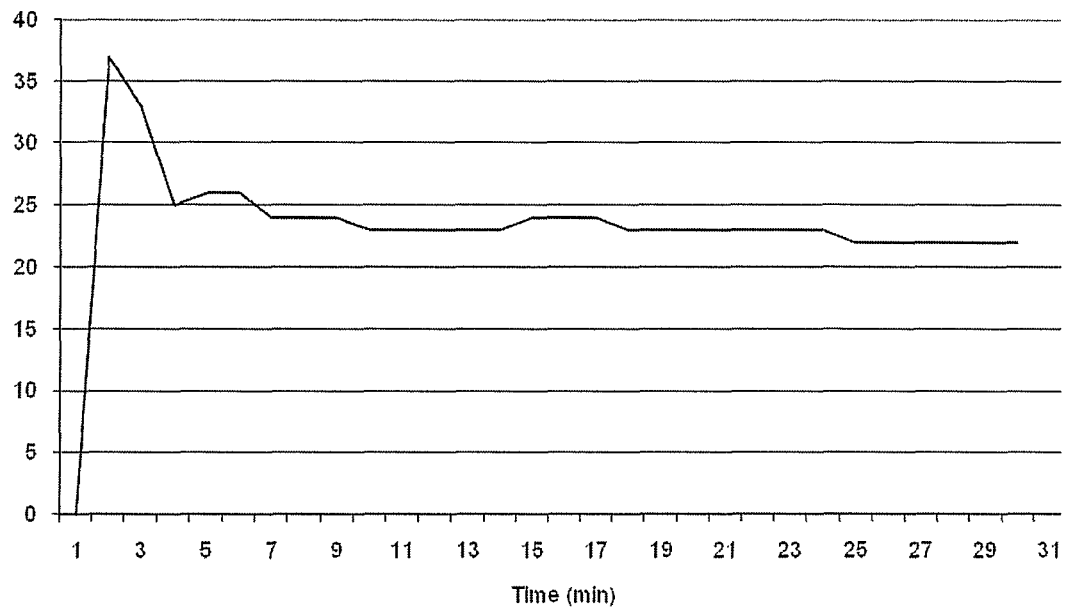

The measurements are plotted in FIG. 6b. After some variations in the beginning of the measurement a substantially even conductivity can be seen during the remainder of the test, indicating that the influence of the electromagnetic field on the test persons was decreased due to the device according to the invention.

The invention is not limited to the examples shown herein, but it also extends to other preferred variants that fall within the scope of the appended claims. It should furthermore be noted that the invention relates to the use of each of the embodiments for reducing the negative effects of radiation. It should moreover be noted that although mention is made of the addition of liquid to a housing, it is also possible, for example, to provide matter in another state, for example a solid state in the form of a powder or even a gas or a chip.

The invention claimed is:

1. A device for reducing harmful effects to people caused by radiation from an electromagnetic device for mobile or wireless communication, comprising:
    an electromagnetic communications device configured to produce a first alternating electromagnetic field at a first frequency and in a spectral range which is harmful to people, wherein the first frequency corresponds to a harmonic frequency belonging to a carrier frequency of a radio frequency (RF) or wireless communication technology;
    extraction means for extracting electric power from the first alternating electromagnetic field;
    transmission means for transmitting a second alternating electromagnetic field that is characterised by a second frequency, wherein the second electromagnetic field is not harmful to people;
    wherein during operation the transmission means are supplied with the electric power extracted by the extraction means and wherein the first and the second frequency are different.

2. A device according to claim 1, wherein the second frequency f2 (in Hz) corresponds substantially to a value from the group of natural frequencies given by the equation:

$$f2 = n1 \times fn \times 10^{n2};$$

where n1 and n2 are integers and fn is a value (in Hz) selected from a group consisting of {22.5 40.0 77.5 78.5 89.5 99.5}.

3. A device according to claim 2, wherein the transmission means are designed to transmit a third alternating electromagnetic field simultaneously with the second electromagnetic field, which third electromagnetic field is characterised by a third frequency that corresponds substantially to a frequency from the group of natural frequencies.

4. A device according to claim 1, wherein the extraction means and the transmission means comprise a first antenna and a second antenna, respectively, for receiving and transmitting the first and the second alternating electromagnetic field, respectively, wherein the first antenna forms part of a first tuned electrical circuit, wherein the second antenna forms part of a second tuned electrical circuit.

5. A device according to claim 4, wherein the first antenna and the second antenna are composed at least in part of the same components.

6. A device according to claim 4, wherein the first and the second tuned circuit are composed at least in part of the same electrical components.

7. A device according to claim 4, wherein the first tuned circuit comprises a discrete coil and/or resistor, said coil and/or resistor having a parasitic capacitance that forms part of the first tuned circuit, wherein the first tuned circuit further comprises a discrete capacitor.

8. A device according to claim 4, wherein the first tuned circuit further comprises a discrete coil and/or resistor, said coil and/or resistor having a parasitic capacitance that forms part of the first tuned circuit, wherein components that carry a current or voltage are provided with an electrically insulating material at an outer side.

9. A device according to claim 4, wherein at least one of the first and second tuned circuit comprises a dissipating element.

10. A device according to claim 1, further comprising an at least partly closed metal housing.

11. A device according to claim 1, further comprising a liquid accommodated in a housing, wherein said liquid comprises at least one of ethanol and water.

12. A method of reducing harmful effects to people caused by radiation from an electromagnetic device for mobile or wireless communication, comprising the steps of:

producing with an electromagnetic communications device a first alternating electromagnetic field at a first frequency and in a spectral range which is harmful to people, wherein the first frequency corresponds to a harmonic frequency belonging to a carrier frequency of a radio frequency (RF) or wireless communication technology;

extracting electric power from the first alternating electromagnetic field;

transmitting a second alternating electromagnetic field that is characterised by a second frequency, wherein the second electromagnetic field is not harmful to people;

wherein the transmission means are supplied with the extracted electric power.

13. A method according to claim 12, wherein the second frequency f2 (in Hz) corresponds substantially to a value from a group of natural frequencies given by the equation:

$$f2 = n1 \times fn \times 10^{n2};$$

where n1 and n2 are integers and fn is a value (in Hz) chosen from a group comprising {22.5 40.0 77.5 78.5 89.5 99.5}.

14. A method according to claim 13, further comprising a step of transmitting a third alternating electromagnetic field simultaneously with the transmission of a second alternating electromagnetic field, which third electromagnetic field is characterised by a third frequency that corresponds substantially to a frequency from the group of natural frequencies.

* * * * *